US009436515B2

(12) United States Patent
Pohlmann (10) Patent No.: US 9,436,515 B2
(45) Date of Patent: Sep. 6, 2016

(54) TENANT VIRTUALIZATION CONTROLLER FOR EXPORTING TENANT WITHOUT SHIFTING LOCATION OF TENANT DATA IN A MULTI-TENANCY ENVIRONMENT

(75) Inventor: Michael Pohlmann, Heidelberg (DE)

(73) Assignee: SAP SE, Walldorf (DE)

( * ) Notice: Subject to any disclaimer, the term of this patent is extended or adjusted under 35 U.S.C. 154(b) by 1011 days.

(21) Appl. No.: 12/981,425

(22) Filed: Dec. 29, 2010

(65) Prior Publication Data

US 2012/0174113 A1 Jul. 5, 2012

(51) Int. Cl.
*G06F 9/46* (2006.01)
*G06F 9/50* (2006.01)

(52) U.S. Cl.
CPC .......... *G06F 9/5088* (2013.01); *G06F 9/5083* (2013.01)

(58) Field of Classification Search
CPC ........................ G06F 9/5083; G06F 9/5088
See application file for complete search history.

(56) References Cited

U.S. PATENT DOCUMENTS

| 2006/0004882 A1* | 1/2006 | Itikarlapalli ........ G06F 11/1479 |
| 2006/0005189 A1* | 1/2006 | Vega ..................... G06F 9/4856 718/1 |
| 2007/0220121 A1* | 9/2007 | Suwarna ............... G06F 9/4856 709/220 |
| 2008/0189700 A1* | 8/2008 | Schmidt ................ G06F 11/203 718/1 |
| 2008/0222375 A1* | 9/2008 | Kotsovinos ........... G06F 9/5083 711/162 |
| 2009/0049056 A1* | 2/2009 | Shutt et al. ...................... 707/10 |
| 2009/0089781 A1* | 4/2009 | Shingai ................. G06F 9/5088 718/1 |
| 2009/0327781 A1* | 12/2009 | Tripathi ........................ 713/324 |
| 2010/0005443 A1* | 1/2010 | Kwok .................... G06Q 10/10 717/100 |
| 2010/0211548 A1* | 8/2010 | Ott .................... G06F 17/30575 707/655 |
| 2010/0242045 A1* | 9/2010 | Swamy et al. ................ 718/104 |
| 2010/0250608 A1* | 9/2010 | Malviya ............ G06F 17/30306 707/792 |
| 2011/0066823 A1* | 3/2011 | Ando ..................... G06F 3/0605 711/171 |
| 2011/0179415 A1* | 7/2011 | Donnellan .......... G06F 9/45558 718/1 |
| 2011/0219050 A1* | 9/2011 | Ly ..................... G06F 17/30528 707/827 |
| 2011/0270945 A1* | 11/2011 | Shiga ..................... G06F 3/0605 709/213 |
| 2011/0283277 A1* | 11/2011 | Castillo ................. G06F 9/5077 718/1 |
| 2011/0302133 A1* | 12/2011 | Kuruganti ......... G06F 17/30557 707/608 |
| 2012/0030312 A1* | 2/2012 | Lehr .................... G06F 17/3089 709/219 |
| 2012/0030404 A1* | 2/2012 | Yamamoto ............ G06F 3/0605 711/6 |

* cited by examiner

*Primary Examiner* — Meng An
*Assistant Examiner* — James J Lee
(74) *Attorney, Agent, or Firm* — Mintz Levin Cohn Ferris Glovsky and Popeo, P.C.

(57) ABSTRACT

A system and method for performing load balancing of systems in a multi-tenancy computing environment by shifting tenants from an overloaded system to a non-overloaded system. Initially, a determination is made as to whether a first tenant desires an access to an instance of a software application. The same instance of the software application is being accessed by other tenants of a first system. If the tenant desires access to the same instance of the software application, the tenant is created at the first system. The created first tenant and the other tenants exist in a multi-tenancy computing environment that enables the first tenant and the other tenants to access a same instance of a software application. Then, it is checked whether the first system is overloaded. If the first system is overloaded, load balancing is performed as follows. The first tenant is exported from the overloaded first system to a lesser loaded second system. The data containers of the first tenant remain stationary at a virtual storage. The first tenant is enabled to access the same instance of the software application that it was accessing while at the first system, but now using memory resources and processing resources of the second system. Related apparatus, systems, techniques and articles are also described.

18 Claims, 5 Drawing Sheets

TENANT VIRTUALIZATION CONTROLLER FOR EXPORTING TENANT WITHOUT SHIFTING LOCATION OF TENANT DATA IN A MULTI-TENANCY ENVIRONMENT

TECHNICAL FIELD

The subject matter described herein relates to performing balancing of load on multi-tenancy computing systems by controlling the movement of tenants on the multi-tenancy computing systems in a multi-tenancy computing environment from an overloaded multi-tenancy computing system to a lesser loaded multi-tenancy computing system.

BACKGROUND

In a multi-tenancy computing environment, multiple tenants share the same runtime environment of a single multi-tenancy computing system. During tenant lifecycle management procedures, multiple tenants can be created in the multi-tenancy computing environment. As the multiple tenants operate in the multi-tenancy computing environment, there may come a point when more tenants cannot be created in a given multi-tenancy computing system because the multi-tenancy computing system's capacity reaches its limits i.e. the multi-tenancy computing system gets overloaded.

To avoid this problem, a controller is required that stops/switches-off tenants in "overloaded" multi-tenancy computing systems and starts/switches-on the stopped tenants in other relatively free or lesser loaded multi-tenancy computing systems. Further, it is desired that the stopping of the tenants and the starting of the tenants occurs without long downtimes and long lasting downtime procedures. In order to upgrade a complete multitenant system, including moving all tenants from one multi-tenancy computing system (i.e. a version of an enterprise application suite and associated data) to another multi-tenancy computing system, conventional procedures allow a move of a tenant from one system to another provided only that the two systems have the same software version.

Conventionally, controllers are known that provide a central point of control for assigning computing resources to run a service on a server at a particular time. However, these known controllers do not work with tenants in a multi-tenancy computing environment. Accordingly, these controllers are not suited to manage the movement of a single tenant from one multi-tenancy computing system to another multi-tenancy computing system.

SUMMARY

This document describes a Tenant Virtualization Controller (TVC) and method for controlling movement of tenants in a multi-tenancy computing environment. For example, the TVC can shift a tenant in a multi-tenancy computing environment from a first multi-tenancy computing system to a second multi-tenancy computing system without shifting the data associated with the tenant in the first multi-tenancy computing system. Data associated with the first multi-tenancy computing system remains stored in a virtual storage while the tenant is being shifted. The stored data is then associated with the shifted tenant in the second multi-tenancy computing system.

In some aspects, a computer-implemented method, system and computer program product execute steps including defining a new tenant at a first system, starting the new tenant at the first system, and determining whether the first system is overloaded. If the system is overloaded, the steps include stopping the new tenant at the first system, unmounting data containers of the new tenant at the first system, exporting the new tenant from the first system to a non-overloaded second system, mounting data containers of the exported new tenant at the second system, and starting the tenant at the second system.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, a single point of control is provided for controlling the movement of tenants from one multi-tenancy computing system to another SAP-system. Further, the controller ensures sharing of load on all multi-tenancy computing systems such that a tenant from an overloaded multi-tenancy computing system is shifted to a lesser loaded multi-tenancy computing system. This shifting of the tenant prevents loss that could have occurred due to the halt in creation of new tenants when a multi-tenancy computing system gets overloaded i.e. the invention addresses the problems that could have been caused due to overloading of a multi-tenancy computing system. For example, overloading of a multi-tenancy computing system can lead to inadequate memory resources and processing resources available to tenants of the overloaded multi-tenancy computing system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 describes a multi-tenancy computing environment.

DETAILED DESCRIPTION

To address these and potentially other issues with currently available solutions, one or more implementations of the current subject matter provide methods, systems, articles or manufacture, and the like that can, among other possible advantages, provide a single point of control for tenant operations in a multi-tenancy computing environment such that the load is balanced between the one or more multi-tenancy computing systems hosting the tenants.

Figure 1:
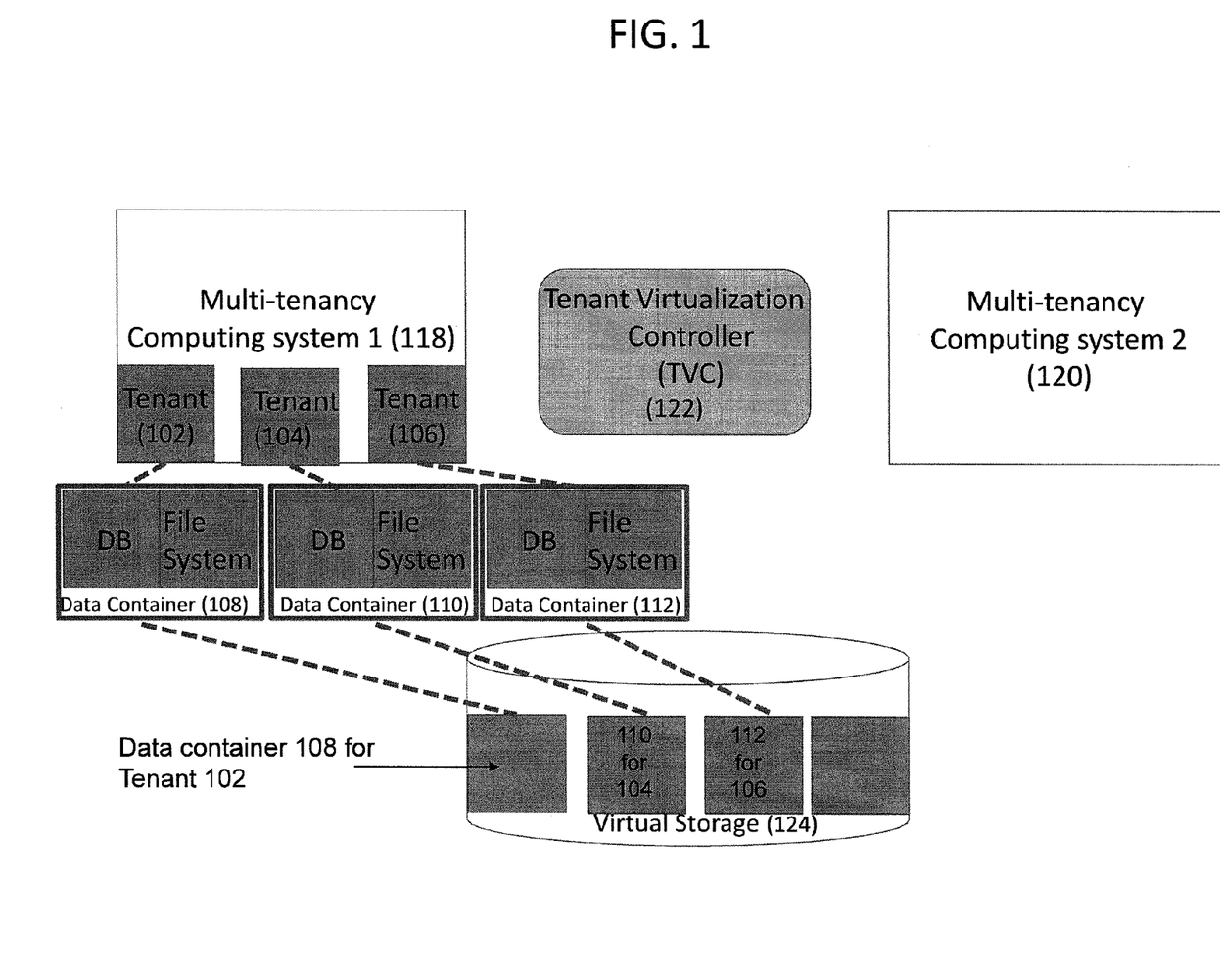

FIG. 1 describes a multi-tenancy computing environment. In a multi-tenancy computing environment, a single instance of a software application running on a multi-tenancy computing system ("multi-tenancy computing system 1 (118)") serves multiple tenants. An example of the software application is "Business ByDesign (ByD)" by SAP. The multi-tenancy computing system may refer to a server hosting the software application. The tenants refer to systems at one of client organizations that access the software application and individual clients that access the software application. The tenants of the multi-tenancy computing environment share the same application. In the multi-tenancy computing environment, each tenant works with a customized virtual application instance. Further, the multi-tenancy computing environment comprises other one or more multi-tenancy computing systems (e.g. "multi-tenancy computing system 2 (120)"), where each of the other one or more multi-tenancy computing systems is capable of serving one or more tenants.

When a new client desires to access an instance of the software application, a new tenant is created in the multi-tenancy computing environment. This creation of tenants, and movement of tenants from one multi-tenancy computing system (e.g. multi-tenancy computing system 1 (118)) to another multi-tenancy computing system (e.g. multi-tenancy computing system 2 (120)), as will be noted later, constitutes tenant lifecycle management.

A multi-tenancy computing environment has the advantage of cost savings for the tenants. The total cost of running all the customized versions of a single instance of an application by different tenants is measured by use of memory and processing resources of the multi-tenancy computing systems in the multi-tenancy computing environment. The total cost is considerably lower than a cost resulted in by each tenant using a different instance of an application instead of using a single instance of the same application. Further, since tenant data corresponding to the different customized versions of a single instance of an application occurs in a similar data structure and has a similar format, the storage of data for different tenants is more compact and organized. Accordingly, retrieval/collection of the described tenant data is easier than collection of data stored for different customers in varying data structures.

FIG. 1 further shows a virtual storage 124 that stores all the data of each tenant. The data of each tenant is stored separately, as shown. The data of each tenant is comprised in a corresponding data container of a corresponding tenant. For example, data of tenant 102 is stored in data container 108, data of tenant 104 is stored in data container 110, and data of tenant 106 is stored in data container 112. Each data container consists of a database values and a file system. The data at the file system level of each tenant is physically separated from the data of other tenants. The physical separation of the data allows a physically separate data container for each tenant, the physically separate data container being stored in the virtual storage 124.

The virtual storage 124 implements virtualization, which allows an abstraction/separation of virtual storage from physical storage, such that the virtual storage 124 is accessed without regard to the physical storage. The virtual storage 124 is also referred to as a virtual volume or a virtual disk.

Figure 4:
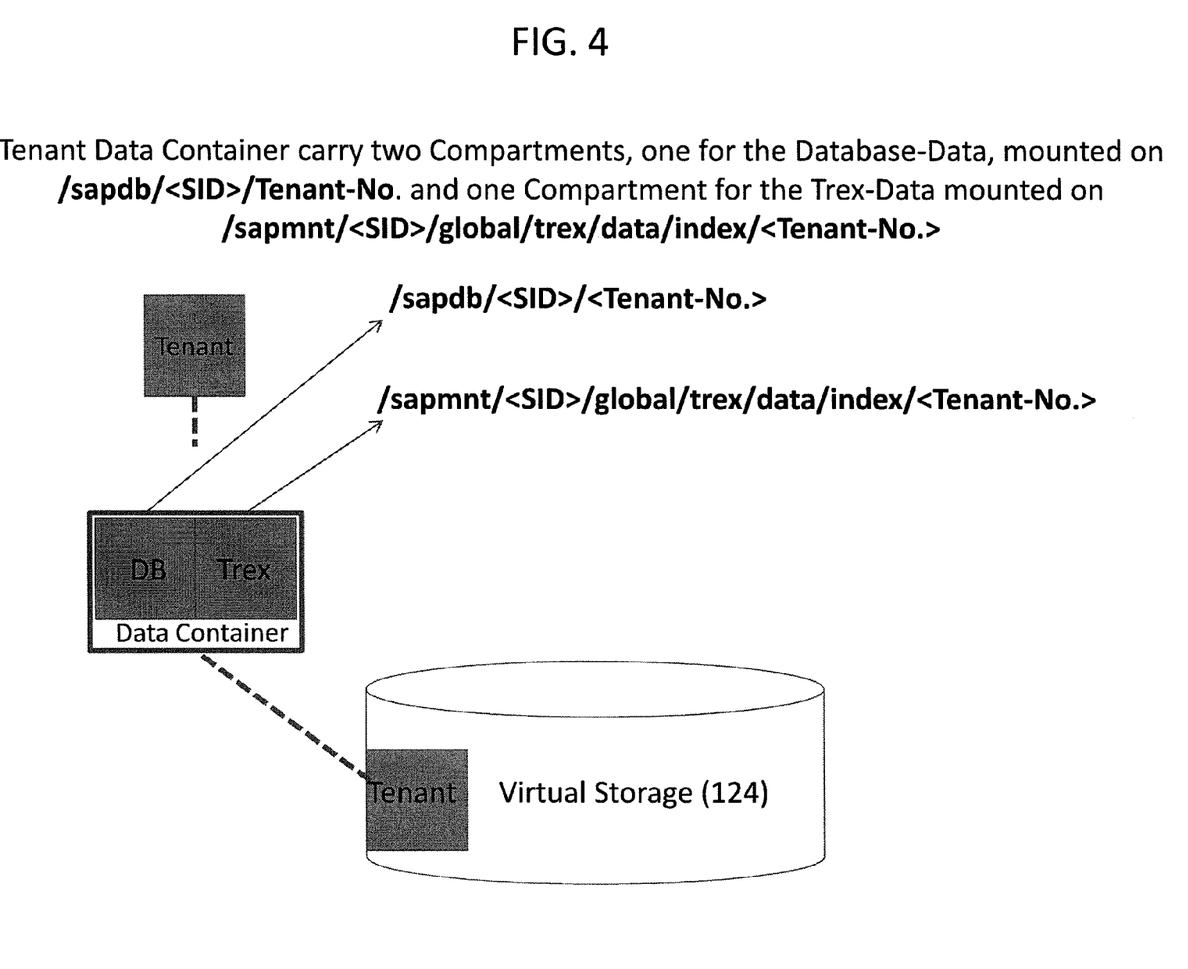
FIG. 4 describes separate tenant data containers for tenants in the multi-tenancy computing environment, and mounting of tenant file-systems on a multi-tenancy computing system.

FIG. 4 illustrates separate data containers for each tenant. The data container for each tenant is stored separately in a storage 124. FIG. 4 shows the data container in the storage 124 being identified by the tenant it corresponds to. FIG. 4 illustrates a Tenant Data Container including two compartments, one for the database-data, mounted on "/sapdb/<SID>/Tenant-No." and one compartment for text-based search data mounted on "/sapmnt/<SID>/global/trex/data/index/<Tenant-No.>"

When new clients desire to access an instance of the software application, new tenants are created. The created tenants access resources (e.g. memory resources and processing resources) of the multi-tenancy computing system on which they are created. When more and more tenants are created, there comes a point when the multi-tenancy computing system is overloaded (i.e. the multi-tenancy computing system has no more capacity for more tenants) and no more tenants can be created on the multi-tenancy computing system. At this point, a tenant virtualization controller helps balance the load on the different multi-tenancy computing systems in the multi-tenancy computing environment. The load balancing levels the hardware demands (e.g. demand arising due to requirement of memory and processing resources on the multi-tenancy computing system) of the tenants across different multi-tenancy computing systems in the multi-tenancy computing environment.

The load balancing distributes the memory resources and the processing resources between at least one of computers, network links, CPUs, and hard drives of both the overloaded multi-tenancy computing system 118 and the lesser loaded multi-tenancy computing system 120. The load balancing achieves optimal utilization of resources of multi-tenancy computing systems in the multi-tenancy computing environment, maximized throughput, and minimized collective response time for the corresponding instances of the software application to respond to all the corresponding tenants.

FIG. 1 further illustrates a tenant virtualization controller (TVC) 122. The TVC 122 coordinates administration of tenants in the multi-tenancy computing environment of tenants in one or more multi-tenancy computing systems. Rather than moving data of tenants from one multi-tenancy computing system to another multi-tenancy computing system or copying the data of tenants at backend when movement of a tenant takes place from one multi-tenancy computing system to another multi-tenancy computing system, the purpose of the TVC 122 is to move the tenant 106 itself from the one multi-tenancy computing system to another multi-tenancy computing system while data associated with the tenant remains stored at a same place (virtual storage 124). The movement is usually from an overloaded multi-tenancy computing system (multi-tenancy computing system 1 (118)) to a lesser loaded multi-tenancy computing system (multi-tenancy computing system 2 (120)). The movement of the tenant 106 from a first multi-tenancy computing system 118, which may be overloaded, to a less-loaded multi-tenancy computing system 120 provides load balancing in the multi-tenancy computing environment. The data associated with the tenant 106 that is being moved remains stored in a data container 112 stored separately from other data containers stored at the virtual storage 124. Accordingly, the data associated with the tenant 106 does not need to be copied at back end while the tenant is being moved. The associated data is not moved or copied as it remains stored in an underlying virtual storage layer 124 that is stationary. The stored data is associated again with the tenant 106 after the tenant 196 has been exported from multi-tenancy computing system 118 to multi-tenancy computing system 120.

The TVC 122 works with a tenant lifecycle management (TLM) tool, which can copy or move data in data containers of tenant 106. The TVC 122 controls the movement of the tenant 106 itself, by handling tenant operations such as powering off and powering on of the tenant 106, exporting the tenant 106 from a first multi-tenancy computing system 118, unmounting data container 112 of the exported tenant 106 from the first multi-tenancy computing system 118, mounting the data container 112 of the exported tenant 106 at a second multi-tenancy computing system 120, importing the exported tenant 106 at the second multi-tenancy computing system 120, and enabling the imported tenant 106 to access an instance of the software application. It is to be noted that the tenant 106 is exported from a first multi-tenancy computing system 118 to a second multi-tenancy computing system 120, rather than exporting data associated with the tenant 106. The data remains stored on the same on a virtual storage 124.

In order to operate as a central point of control, TVC 122 needs to be connected to the multi-tenancy computing systems (multi-tenancy computing system 1 (118) and multi-tenancy computing system 2 (120)) that are involved in exporting and importing a tenant. An agent framework runs on each multi-tenancy computing system of the multi-tenancy computing environment to perform the following functions:

Provide the tenant virtualization controller (TVC) 122 with information about the multi-tenancy computing systems and their corresponding tenants (102, 104 and 106) in the multi-tenancy computing environment.

Unmount file-systems in data containers (e.g. data container 112) of tenants (e.g. tenant 106) at multi-tenancy computing systems (e.g. multi-tenancy computing system 118) that export tenants (e.g. tenant 106) and mount file-systems of the exported tenants at multi-tenancy computing systems (e.g. multi-tenancy computing system 120) that import the exported tenants.

De-register and register the tenants (e.g. tenant 106), which are exported, in database of data containers (e.g. data container 112) that remain stored as a physically separate container in virtual storage 124.

Stop tenants (e.g. tenant 106) and start tenants (e.g. tenant 106), wherein stopping tenants refers to disabling tenants from accessing an instance of the software application, and starting tenants refers to enabling tenants from accessing an instance of the software application.

Further, on every multi-tenancy computing system, the agent framework of the TVC 122 takes care that the correct data containers of the operated tenant are mounted and unmounted on the operating system level of the multi-tenancy computing system.

One major prerequisite for a TVC 122 is to receive the design and layout of the multi-tenancy computing system and the data structure of each tenant in the multi-tenancy computing environment. The design and layout consists of a separate storage container for each tenant, as noted in FIG. 4.

Figure 2:
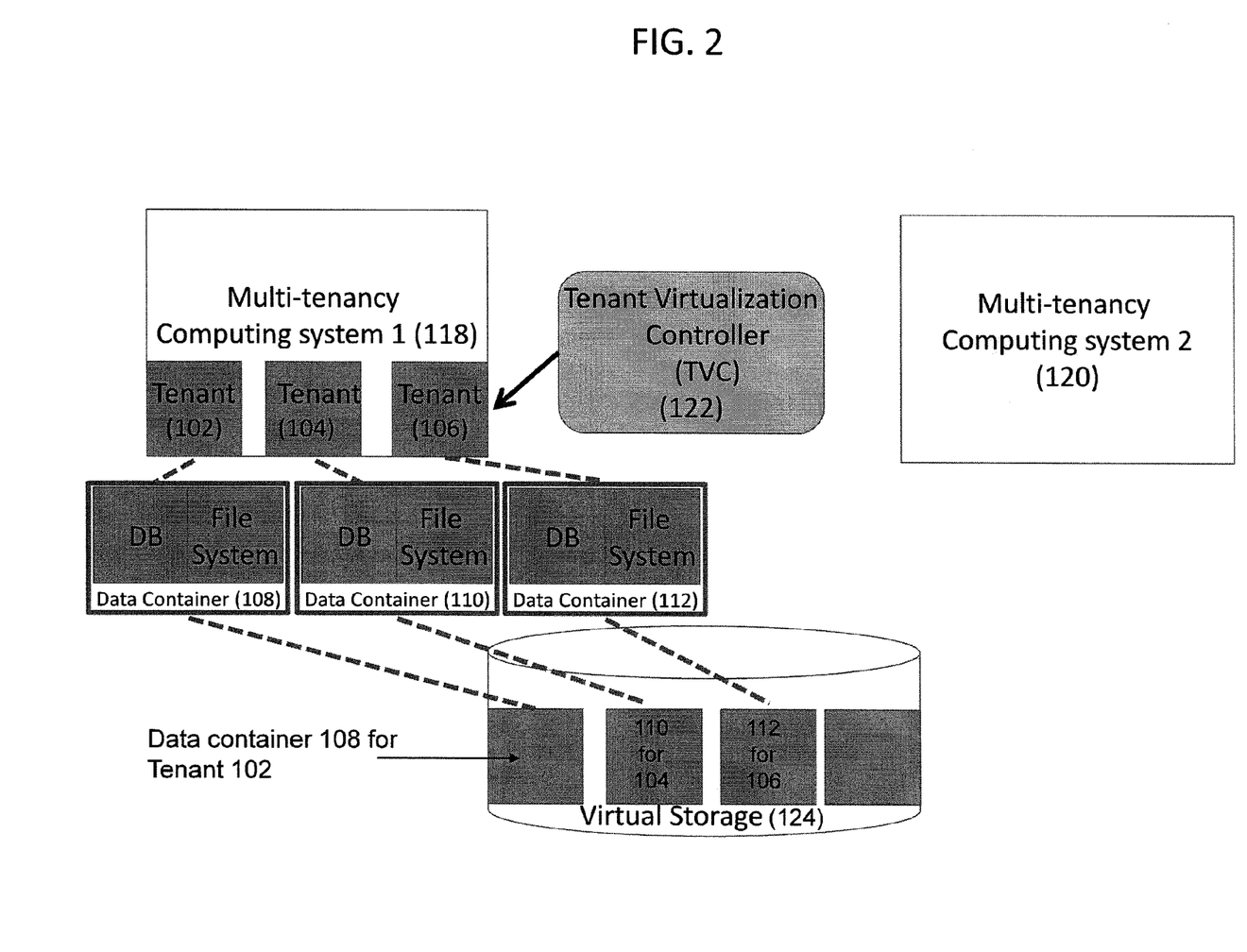
FIG. 2 describes a tenant virtual controller (TVC) enabling export of a tenant from an overloaded multi-tenancy computing system.

FIG. 2 describes the operations that the TVC 122 performs at the overloaded multi-tenancy computing system 118. These operations at the overloaded multi-tenancy computing system 118 enable the export of the tenant 106 from the overloaded multi-tenancy computing system 118. These operations are as follows:

The tenant 106 that is to be exported is switched/powered off. i.e. the tenant 106 is stopped.

The tenant 106 that is to be exported is de-registered from the database of the data container 112.

The file-systems in the data container 112 are unmounted from the tenant 106 at the operating system level.

Figure 3:
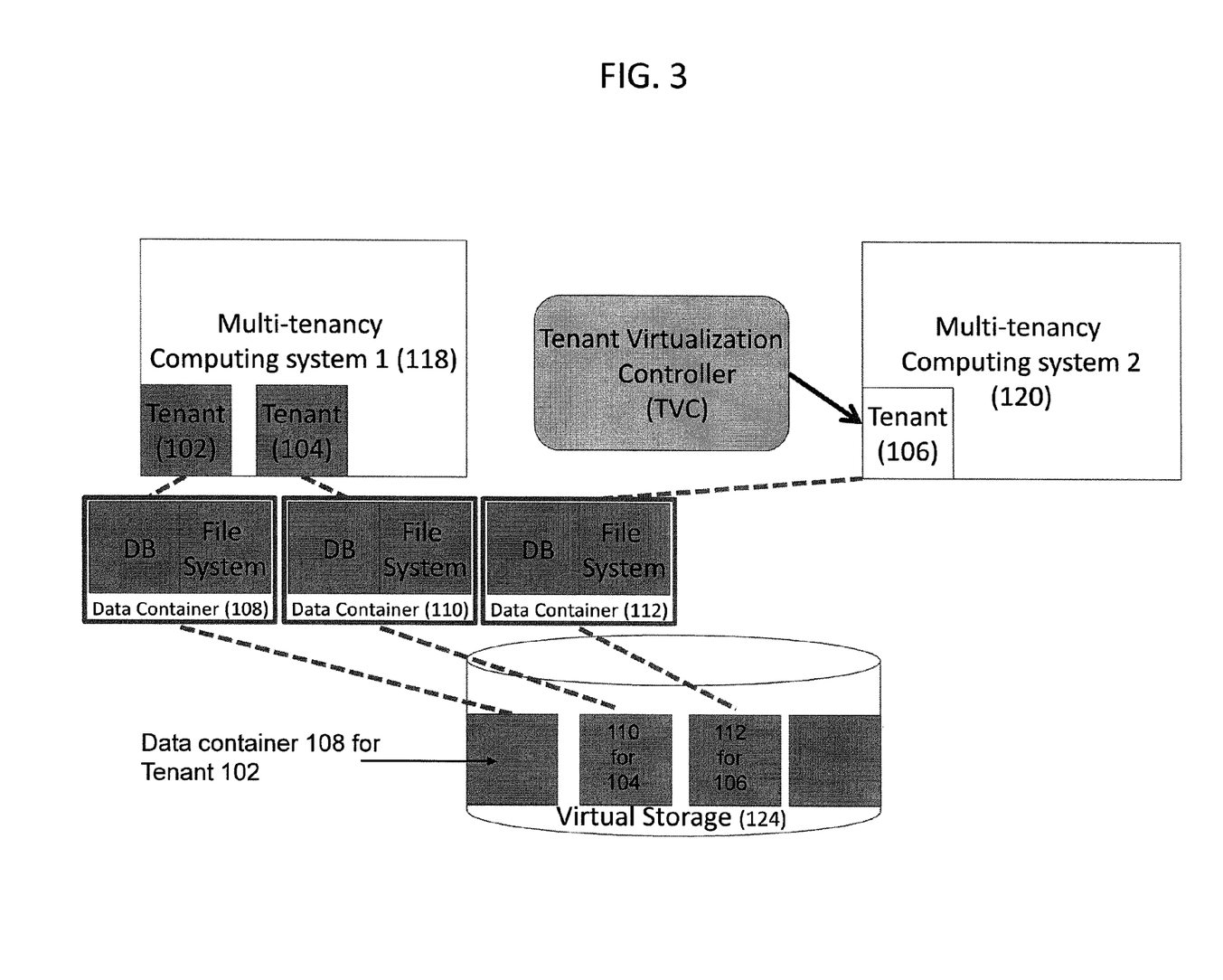
FIG. 3 describes a tenant virtual controller (TVC) enabling import of a tenant to a lesser loaded multi-tenancy computing system.

FIG. 3 illustrates the operations that the TVC 122 performs at the lesser loaded multi-tenancy computing system 120. These operations at the lesser loaded multi-tenancy computing system 120 enable the import of the tenant 106 to the lesser loaded multi-tenancy computing system 120. These operations are enlisted as follows:

The file-systems in the data container 112 are mounted on the exported (or imported with respect top multi-tenancy computing system 120) tenant 106 at the operating system level of the lesser loaded multi-tenancy computing system 120.

The tenant 106 is registered with the database in the data container 112 that remains stored as a physically separate container in virtual storage 124.

The imported tenant 106 is switched/powered on. i.e. the tenant 106 is started.

As described above with respect to FIG. 2 and FIG. 3, the TVC 122 can stop the tenant 106 at an overloaded multi-tenancy computing system 118, and then start the tenant 106 at lesser loaded (or non-overloaded) system 120. In another embodiment, the TVC 122 also has the capability of stopping and starting a tenant on a same multi-tenancy computing system. Stopping and starting a tenant on the same multi-tenancy computing system may be performed to prevent an overload on the same multi-tenancy computing system.

Therefore, the TVC 122 can orchestrate an entire landscape of tenants in a complex infrastructure. Thus, the TVC 122 works as a single point of central control for administration and maintenance of multiple tenants in a multi-tenancy computing environment. The tenant virtualization controller controls all relevant tenant operations described above, and enables all the described tenant operations to be carried out without wasting manual effort, but effectively by some mouse-clicks in a central tool. The TVC 122 further simplifies the operation of large and complex multi-tenancy computing landscapes, as it combines virtualization (as noted in the implementation of a SAP Adaptive Computing Controller, as discussed earlier) with multi-tenancy in a computing platform.

Figure 5:
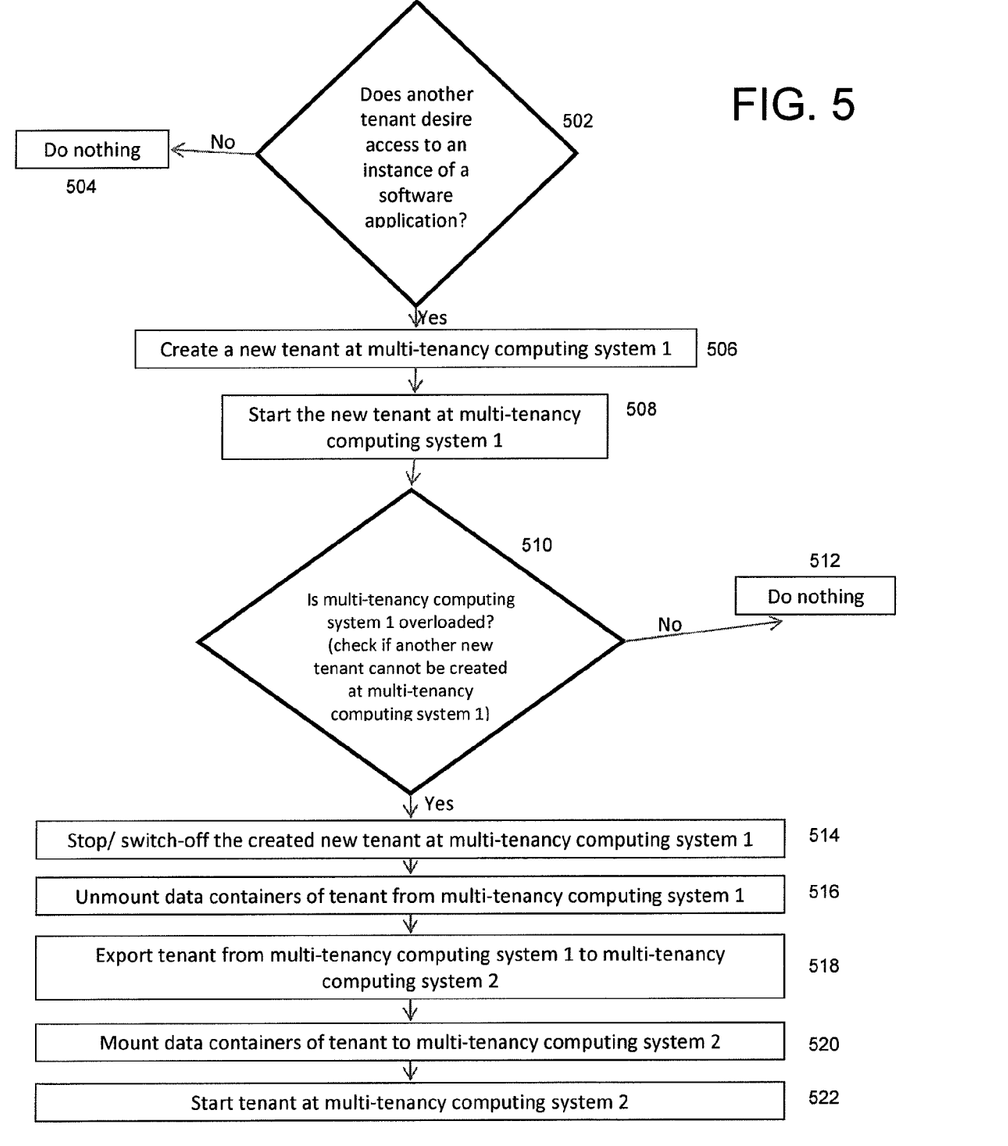
FIG. 5 describes a process flow diagram illustrating aspects of a method consistent with implementations of the current subject matter; and When practical, similar reference numbers denote similar structures, features, or elements.

FIG. 5 is a process flow diagram that illustrates a method 500 for controlling movement of tenants in a multi-tenancy computing environment. With reference also to FIGS. 1-4, at 502, a determination is made if a first tenant 106 desires an access to an instance of a software application at a first multi-tenancy computing system 118. The same instance of the software application is being accessed by other tenants including tenant 102 and tenant 104 of the first multi-tenancy computing system 118. If the tenant 106 seeks access to the instance of the software application, at 506, the tenant 106 is created at the first multi-tenancy computing system 118. The created tenant is associated with a file system and database in data container 112. Each tenant is associated with a separate data container that stores data associated with the respective tenant. Each data container is stored physically separately in virtual storage 124. The tenant 106 and the other existing tenants exist in a multi-tenancy computing environment that enables the tenant 106 and the other existing tenants to access a same instance of a software application. At step 508, the created tenant 106 is started i.e. the tenant is enabled to access an instance of the software application. Then, at step 510, it is checked whether the first multi-tenancy computing system 118 is overloaded.

If new tenants cannot be created at the first multi-tenancy computing system 118 (i.e. if new tenants cannot use the memory and processing resources of the first multi-tenancy computing system 118), then the first multi-tenancy computing system 118 is determined as being overloaded. If the first multi-tenancy computing system 118 is overloaded, load balancing is performed as follows. At step 514, the tenant 106 that was started is now stopped i.e. the tenant 106 is disabled from accessing the instance of the software application. In other embodiments, other tenants including one of tenant 102 and tenant 104 may be stopped based on a predetermined criteria. In the description that follows, it is assumed that the tenant 106 is stopped. At step 516, data container 112 of the stopped tenant 106 is then unmounted from the first multi-tenancy computing system 118. At step 518, the stopped tenant 106 is exported from the first multi-tenancy computing system 118 to a lesser loaded (or non-overloaded) second multi-tenancy computing system 120 for load balancing. At step 520, the unmounted data container 112 is mounted to the tenant 106 at the second multi-tenancy computing system 120. The data container 112 of the first tenant that remains stationary at the virtual storage 124 is mounted at the second multi-tenancy computing system 120. At step 522, the exported tenant 106 is started at the second multi-tenancy computing system 120 i.e. tenant 106 is enabled to access the same instance of the software application that it was accessing while at the first multi-tenancy computing system 118, but now using the memory resources and processing resources of the second multi-tenancy computing system 120. Thus, the method provides load balancing of multi-tenancy computing systems in a multi-tenancy computing environment by moving/shifting tenant 106 from an overloaded multi-tenancy computing system 118 to a lesser loaded (or non-overloaded) multi-tenancy computing system 120.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of controlling movement of tenants in a multitenancy computing environment using one or more processors of a tenant virtualization controller, the method comprising:
   defining a new tenant at a first system of the multi-tenancy computing environment, the first system being communicatively connected to the tenant virtualization controller via a first network link;
   starting the new tenant at the first system;
   storing data associated with the new tenant in a data container stored in a virtual storage, wherein the data container comprises a database and a file system;
   determining whether the first system is overloaded; and
   if the first system is overloaded, performing operations comprising:
      stopping the new tenant at the first system;
      de-registering the new tenant from the database of the data container;
      unmounting the file system in the data container from the new tenant at the first system;
      determining a second system that is not overloaded, the second system being communicatively connected to the tenant virtualization controller via a second network link;
      exporting the new tenant from the first system to the determined second system of the multi-tenancy computing environment without shifting storage location of the data associated with the new tenant;
      mounting the file system in the data container on the exported new tenant at the second system;
      registering the exported new tenant with the database of the data container that remained stored in the virtual storage; and
      starting the tenant at the second system, wherein the first system and the second system are multi-tenancy computing systems.

2. The method in accordance with claim 1, wherein the data container further comprises
   two compartments comprising a first compartment for database data and a second compartment for text-based search data.

3. The method in accordance with claim 1, wherein the new tenant is defined in the multi-tenancy computing environment that enables a plurality of tenants including the new tenant to access a single instance of a same software application.

4. The method in accordance with claim 1, wherein the starting of the new tenant enables the first new client to access a same instance of a software application as being accessed by other tenants in the multi-tenancy computing environment.

5. The method in accordance with claim 1, wherein the stopping of the new tenant disables the first new client to access a software application as being accessed by other tenants in the multi-tenancy computing environment.

6. The method in accordance with claim 1, wherein the determination of whether the first system is overloaded is based on determining whether a second new tenant can be defined at the first system such that the second new tenant can use memory resources and processing resources of the first system.

7. The method in accordance with claim 6, wherein the first system is overloaded when the second new tenant cannot be defined at the first system such that the second new tenant cannot use memory resources and processing resources of the first system.

8. The method in accordance with claim 1, wherein the tenant virtualization controller combines virtualization with multi-tenancy in the multi-tenancy computing environment.

9. A computer program product comprising a non-transitory machine-readable medium storing instructions that, when executed by at least one programmable processor, cause the at least one programmable processor of a tenant virtualization controller to perform operations comprising:
   defining a new tenant at a first system, the first system being communicatively connected to the tenant virtualization controller via a first network link;
   starting the new tenant at the first system;
   storing data associated with the new tenant in a data container stored in a virtual storage, wherein the data container comprises a database and a file system;
   determining whether the first system is overloaded; and
   if the system is overloaded, performing further operations comprising:
      stopping the new tenant at the first system;
      de-registering the new tenant from the database of the data container;
      unmounting the file system in the data container from the new tenant at the first system;
      determining that a second system is non-overloaded, the second system being communicatively connected to the tenant virtualization controller via a second network link;
      exporting the new tenant from the first system to the non-overloaded second system without shifting location of the data associated with the new tenant;
      mounting the file system in the data container on the exported new tenant at the second system;
      registering the exported new tenant with the database of the data container that remained stored in the virtual storage; and
      starting the tenant at the second system, wherein the first system and the second system are multi-tenancy computing systems.

10. The computer program product in accordance with claim 9, wherein the new tenant is defined in a multi-tenancy computing environment that enables a plurality of tenants including the new tenant to access a single instance of a same software application.

11. The computer program product in accordance with claim 9, wherein the starting of the new tenant enables the first new client to access a same instance of a software application as being accessed by other tenants in a multi-tenancy computing environment.

12. The computer program product in accordance with claim 9, wherein the stopping of the new tenant disables the first new client to access a software application as being accessed by other tenants in a multi-tenancy computing environment.

13. The computer program product in accordance with claim 9, wherein:
   the determination of whether the first system is overloaded is based on determining whether a second new tenant can be defined in a multi-tenancy computing environment at the first system such that the second new tenant can use memory resources and processing resources of the first system; and
   the first system is overloaded when the second new tenant cannot be defined at the first system such that the second new tenant cannot use memory resources and processing resources of the first system.

14. A system comprising:
   at least one programmable processor; and
   a machine-readable medium storing instructions that, when executed by the at least one processor of a tenant virtualization controller, cause the at least one programmable processor to perform operations comprising:
   defining a new tenant at a first system communicatively connected to the tenant virtualization controller via a first communication network;
   starting the new tenant at the first system;
   storing data associated with the new tenant in a data container stored in a virtual storage, wherein the data container comprises a database and a file system;
   determining whether the first system is overloaded; and
   if the system is overloaded, performing functions comprising:
      stopping the new tenant at the first system;
      de-registering the new tenant from the database of the data container;
      unmounting the file system in the data container from the new tenant at the first system;
      determining whether a second system is overloaded, the second system being communicatively connected to the tenant virtualization controller via a second communication network;
      exporting the new tenant from the first system to the second system when the second system is non-overloaded without shifting location of the data associated with the new tenant;
      mounting the file system in the data container on the exported new tenant at the second system;
      registering the exported new tenant with the database of the data container that remained stored in the virtual storage; and
      starting the tenant at the second system, wherein the first system and the second system are multi-tenancy computing systems.

15. The system in accordance with claim 14, wherein the new tenant is defined in a multi-tenancy computing environment that enables a plurality of tenants including the new tenant to access a single instance of a same software application.

16. The system in accordance with claim 14, wherein the starting of the new tenant enables the first new client to access a same instance of a software application as being accessed by other tenants in a multi-tenancy computing environment.

17. The system in accordance with claim 14, wherein the stopping of the new tenant disables the first new client to access a software application as being accessed by other tenants in a multi-tenancy computing environment.

18. The system in accordance with claim 14, wherein the determination of whether the first system is overloaded is based on determining whether a second new tenant can be defined in a multi-tenancy computing environment at the first system such that the second new tenant can use memory resources and processing resources of the first system, and wherein the first system is overloaded when the second new tenant cannot be defined at the first system such that the second new tenant cannot use memory resources and processing resources of the first system.

* * * * *